WERNER & DEUTSCHMANN
Gas Purifier.
No. 15,267. Patented July 1, 1856.
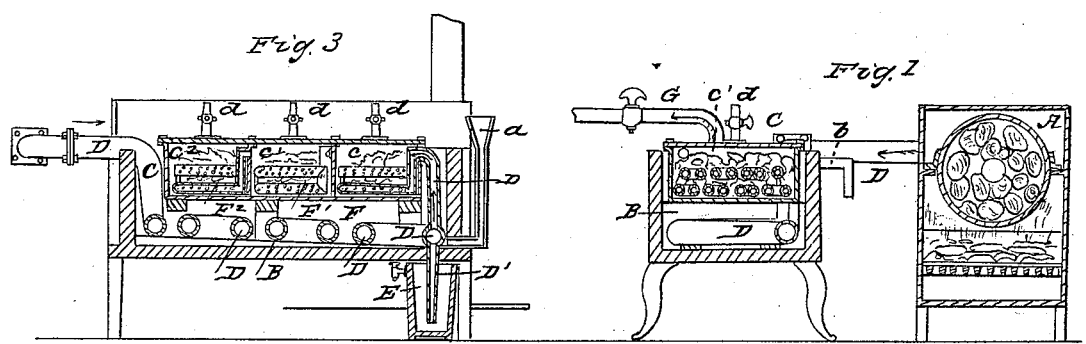
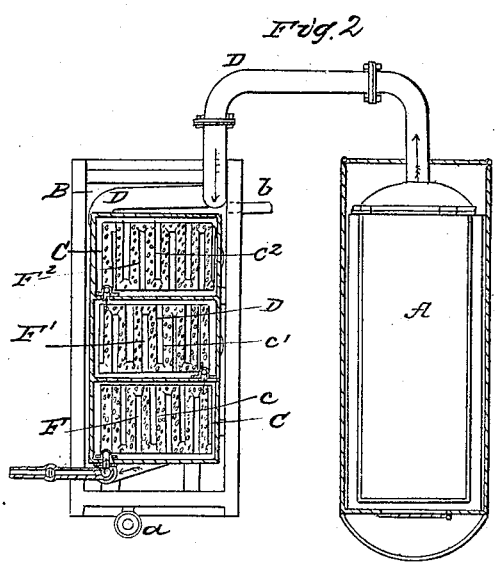

UNITED STATES PATENT OFFICE.

C. F. WERNER, OF NEW YORK, AND C. DEUTSCHMANN, OF BUFFALO, NEW YORK.

DRY-LIME GAS-PURIFIER.

Specification of Letters Patent No. 15,267, dated July 1, 1856.

*To all whom it may concern:*

Be it known that we, CHARLES FREDERICK WERNER, of the city, county, and State of New York, and CHARLES DEUTSCHMANN, of the city of Buffalo, in the county of Erie and State of New York, have invented a new and useful Arrangement of Cooler, Cooling-Pipe, and Lime-Purifier for Purifying Illuminating-Gas; and we do hereby declare that the following is a full, clear, and exact description of the same, reference being had to the accompanying drawings, forming part of this specification, in which—

Figure 1, is a vertical transverse section of a gas retort, cooler, cooling pipe, and lime purifier; the cooler, cooling pipe, and lime purifier being arranged according to our invention. Fig. 2, is a plan of the same. Fig. 3, is a longitudinal vertical section of the purifier, cooling pipe and cooler.

Similar letters of reference indicate corresponding parts in the several figures.

This invention is applicable to the purification of all illuminating gases which can be purified by contact with lime, and is principally intended for small portable apparatus. It consists in the arrangement as hereinafter described of a cooling pipe and lime purifier in the same cooling vessel, whereby the purifying apparatus is brought into a compact, convenient, and portable form.

A, is the retort in which the gas is generated.

B, is the cooler consisting of an open vessel which may be of wood, supplied continually with cool water by a pipe $a$, at one end and provided at the other end with an overflow pipe $b$, for the water which has become warm in the process.

C, is the purifier which is an iron vessel placed within the condenser, and is divided into three compartments.

D, is a pipe by which the gas leaves the retort. This pipe D, enters the cooler at one end and passes down to the bottom thereof, where it circulates back and forth below the purifier in a serpentine form to the other end, where it branches off upward and downward, as shown in Fig. 3, the downward branch D', entering a vessel E, and the upward branch D, entering the first compartment $c$, of the purifier, at its entrance to which it connects with a pipe F, which is thickly perforated with very minute orifices and closed at its extremity, and which runs back and forth many times through its compartment of the purifier in which it is surrounded by and covered with hydrate of lime.

The gas in passing through the pipe D, is cooled and all condensable matter as tar, is precipitated and conducted by the pipe D', into the vessel E. The gas partly purified by cooling, enters the pipe F, and escapes therefrom in minute streams into the compartment of the purifier where it percolates through the hydrate of lime, afterward escaping from this compartment by a pipe F', like F, which is placed in a second compartment $c'$, of the purifier, and after being purified in the second compartment escapes by another pipe $F^2$, of the same kind into a third compartment $c^2$, from which after having been for the third time purified by passing through hydrate of lime it escapes by a pipe G, to the gasometer.

As in the first compartment $c$, of the purifier there will be collected all or nearly all the bituminous matter which escapes condensation in the pipe D, the lime in that compartment will become impure before that in the others, and will require to be thrown away after every charge of the retort has been worked off. The pipe F, of this compartment will also require to be cleaned after every operation by being thoroughly heated in some convenient manner. To economize in the use of lime, we replace the lime in the first compartment $c$, for a subsequent operation, by the lime from the second compartment $c'$, and replace that by the lime from the third compartment and replenish the third compartment with new lime.

The several compartments of the purifier are furnished with cocks $d$, $d$, to let out atmospheric air at the commencement of the operation and the pipe D, has a branch $D^2$, with a cock for the same purpose.

The arrangement of the several parts of the purifying apparatus makes it very effective, compact and durable.

What I claim as my invention, and desire to secure by Letters Patent, is—

The arrangement of the lime purifier in the same vessel or cooler B, with the cooling pipe, when the said cooling pipe is arranged in serpentine form below the purifier, in the manner substantially as herein described.

CHARLES FREDR. WERNER.
CHARLES DEUTSCHMANN.

Witnesses:
 THEODORE ATORF,
 B. DEUTSCHMANN,
 WM. TUSCH.